(12) United States Patent
Miceli et al.

(10) Patent No.: US 6,590,519 B2
(45) Date of Patent: Jul. 8, 2003

(54) METHOD AND SYSTEM FOR IDENTIFICATION OF SUBTERRANEAN OBJECTS

(75) Inventors: Gilbert F. Miceli, Denver, CO (US); Michael Parisi, Boylestown, PA (US)

(73) Assignee: Hot/Shot Radar Inspections, LLC, Lakewood, CO (US)

( * ) Notice: Subject to any disclaimer, the term of this patent is extended or adjusted under 35 U.S.C. 154(b) by 0 days.

(21) Appl. No.: 09/803,397

(22) Filed: Mar. 9, 2001

(65) Prior Publication Data

US 2001/0035836 A1 Nov. 1, 2001

Related U.S. Application Data

(63) Continuation-in-part of application No. 09/680,745, filed on Oct. 7, 2000, now Pat. No. 6,246,355, which is a continuation-in-part of application No. 09/745,329, filed on Dec. 20, 2000, now Pat. No. 6,522,284.
(60) Provisional application No. 60/171,548, filed on Dec. 22, 1999, and provisional application No. 60/191,444, filed on Mar. 22, 2000.

(51) Int. Cl.$^7$ .......................... G01S 13/88; G01S 13/86; G01S 13/89
(52) U.S. Cl. .............................. 342/22; 342/25; 342/27; 342/52; 342/53; 342/54; 342/175; 342/195; 342/196; 342/357.01; 342/357.06; 701/200; 701/207; 701/213
(58) Field of Search .............................. 342/21, 22, 25, 342/27, 28, 175, 190–197, 357.01–357.17, 52–58, 1–12, 61–75, 89, 118, 147, 162, 165, 166–174, 450–465; 701/200, 207, 208–216; 324/337, 642; 345/440

(56) References Cited

U.S. PATENT DOCUMENTS

| | | |
|---|---|---|
| 4,583,095 A | 4/1986 | Peterson |
| 5,444,441 A | 8/1995 | Sutton |
| 5,502,444 A | 3/1996 | Kohlberg ...................... 342/22 |
| 5,512,834 A | 4/1996 | McEwan et al. |
| 5,673,050 A | 9/1997 | Moussally et al. ............ 342/22 |
| 5,883,591 A | 3/1999 | McEwan ...................... 342/22 |
| 5,886,662 A | 3/1999 | Johnson ....................... 342/25 |
| 5,905,455 A | 5/1999 | Heger et al. .................. 342/22 |
| 6,091,354 A | 7/2000 | Beckner et al. ............... 342/22 |

FOREIGN PATENT DOCUMENTS

JP  11-153675 A  *  6/1999  ........... G01S/13/88

OTHER PUBLICATIONS

R. Jerry Jost, *Airborne Underground Imaging–Radar System Definition Final Report*, pp. 1–5, System Planning Corporation, Arlington VA 22207; Feb. 20, 1995.

(List continued on next page.)

Primary Examiner—Bernarr E. Gregory
(74) Attorney, Agent, or Firm—Townsend and Townsend and Crew LLP

(57) ABSTRACT

A radar source is configured on a vehicle, which may be an airborne vehicle such as a helicopter. An arrangement of at least one computer system is provided in communication with the radar source and configured to accept instructions from an operator and to operate the radar source. As the vehicle moves in the vicinity of a subterranean volume along a navigation path, a radar signal is propagated with the radar source into the subterranean volume. A reflected radar signal from a subterranean object within the subterranean volume is received. Physical characteristics of the subterranean object are ascertained from the reflected radar signal.

59 Claims, 9 Drawing Sheets

OTHER PUBLICATIONS

S.I. Tsunoda et al., *Lynx: A high–resolution synthetic aperture radar*, pp. 1–8, SPIE Aerosense 1999, vol. 3704 *GPR for Structural Assessment*, www.sensoft.on.ca/struc.htm.

*SAR Theory/Interpreting Images*, Alaska SAR Facility's Homepage, 1995, www.glue.umd.edu/~gsun/radar/sar_theory.html.

*SAT FAQ—Frequently Asked Questions*, 1998, www.asf.alaska.edu/uder_sev/sar_faq.html.

*An economic extension to every company's resources*, Activities at ERA, www.era.co.uk/act/act/htm, no date.

*Passive millimetre–wave imaging*, DERA, 1999, www-.dra.hmg.gb/html/products/electron/esrdpmwi.htm.

*Microradar Sensors for the Next Millennium*, McEwan Technologies, LLC, 1999, www.getradar.com/about_us/shtml.

*A digital Ground Penetrating Radar System*, RAMAC/GPR 1998–2000, www/terraplus.com/grdetails.htm, no date.

*Sandia and General Atomics Developed New Synthetic–Aperture Radar*, SPACEDDAILY, 1999, www.spacedaily.com/spacecast/news/radar–99c/html.

*Sandia, General Atomics unveil new fine resolution synthetic–aperture radar system*, News Release 1999, www.sandia.gov/media/NewsRel/NR1999/Lynx.htm.

*Lynx Synthetic Aperture Radar (SAR)*, General Atomics, www.generalatomics.com/atg/SAR/lynx/SAR.html, no date.

Peavy Display Products, *Aviation Software—Flitesoft Flight Planning & Vista Moving Map: General Overview*, www-.peavynet.com/productslist/software.htm, no date.

ENSCO, Inc., *Rail Technology*, www.ensco.com/business/rail.htm, no date.

Landmine and UXO Detection with pulseEKKO Ground Penetrating Radar, *Landmine & Unexposed Ordnance Detection*, www.sensoft.on.ca/landm.htm, no date.

Noggin ground penetrating radar for Archaeological Investigations, *Use Your Noggin for Archaeological Studies*, www.sensoft.on.ca/Noggin/nogarcheaeolgy.htm, no date.

*Um–Rolla, Four Other Universities Begin Land Mine Research*, MURI News Release, www.isc.umr.edu/MRUI%20News%20Release.html, no date.

Joint Research Centre—European Commission, *JRC Support to Civilian Demining R&D*, w.ei.jrc.it/landmines/jrc.html, no date.

Advanced Sensor Federated Laboratory—About Radar, *ASC Radar Advanced Sensor Consortium*, www.wsiwyg://72/http://sensor.sanders.com/public/radar.html, no date.

The ASC Homepage, *Advanced Sensors Federated Laboratory*, http://sensor.sanders.com/fast/html, no date.

Unique ARL Facilities, *Unique ARL Facilities*, http://w3.arl.mil/tto/ARLDTT/FoxProdata/facindex.html, do date.

ARL Information Server, *The ARL DTT Brochure*, http://w3.arl.mil/tto/ARLDTT/FoxProdata/dirindex.html.

ARL Directorate Information, *The ARL DTT Brochure—Sensors & Electron Devices*, http://w3.arl.mil/tto/ARLDTT/FoxProdata/dir6.html, no date.

Unique ARL Facilities, *Ultra Wideband (UWB) Synthetic Aperture Radar (SAR) Test Bed Located At Adelphi, MD*, http://w3.arl.mil/tto/ARLDTT/FoxProdata/fac34.html, no date.

Karl A. Kappra, Francis Le, Lam Nguyen, Taun Ton, Matthew Bennett, *Ultra–Wideband Foliage and Ground–Penetrating Radar Experiments*, pp. 1–4, Dec. 1995.

B. Sai, I. Morrow, P. van Genderen, *Limits of Detection of Buried Landmines Based on Local Echo Contrasts*, pp. 1–5, no date.

A.G. Yarovoy, R.V. De Jongh, and L.P. Ligthart, *IRCTR Activities in Modeling of Electromagnetic Wave Transmission Through an Air–Ground Interface*, pp. 1–7, no date.

A.G. Yarovoy, B. Sai, G. Hermans, P. van Genderen, L.P. Ligthart, A.D. Schukin, I.V. Kaploun, *Ground Penetrating Impulse Radar for Detection of Small and Shallow–Buried Objects*, pp. 1–3, 1999 IEEE.

A.G. Yarovoy, R.V. de Jongh, and L.P. Ligthart, *Transmission of Electromagnetic Fields Through an Air–Ground Interface in the Presence of Statistical Roughness*, pp. 1–4, no date.

A. Snip, I.L. Morrow, P. van Genderen, *Evaluation of Antennas in a Stepped Frequency*, pp. 1–6, Jan. 1999.

R.V. de Jongh, A.G. Yarovay, L.P. Ligthart, I.V. Kaploun, A.D. Schukin, *Design and Analysis of New GPR Antenna Concepts*, pp. 1–6, no date.

August Golden and Marc A. Ressler, *Formulation of Chirp and Impulse Transmitter Requirements for Synthetic Aperture Radar*, pp. 1–4, no date.

The ASC Homepage, *Advanced Sensor Federated Laboratory*, http://sensor.sanders.com/fast.html, no date.

*1997 Annual Report of the Advanced Sensors Consortium*, Army Research Laboratory Federated Laboratory Program, pp. 1–17, no date.

Sandia National Laboratories, *What is Synthetic Aperture Radar?*, www.sandia.gov/RADAR/whatis.html, pp. 1–3, no date.

Sandia National Laboratories, *Synthetic Aperature Radar Applications*, www.sandia.gov/RADAR/sarapps.html, pp. 1–3, no date.

Sandia National Laboratories, *Sandia SAR Capabilities*, www.sandia.gov/RADAR/carcap.html, no date.

Sandia National Laboratories, *Sandia Synthetic Aperature Radar Programs*, www.sandia.gov/RADAR/programs.html, pp. 1–2, no date.

Sandia National Laboratories, *Synthetic Aperture Radar Imagery*, www.sandia.gov/RADAR/imagery.html, no date.

Sandia National Laboratories, *UHF Synthetic Aperture Radar Imagery*, www.sandia.gov/RADAR/imageryuhf-.html, no date.

SAR References, pp. 1–5, May 1, 2000.

Canada Centre for Remote Sensing, *The CCRS C & X Band SAR*, www.ccrs.nrcan.gc.ca/ccrs/tekrd/satsens/sarbro/sbmaine.html, pp. 1–2, no date.

Duke and Four Other Universities Begin Landmine Research, *Duke and Four Other Universities Begin Landmine Research*, www.ee.duke.edu/'ycao/landmine.html, pp. 1–4, no date.

Warfare Technology, *Mine countermeasures, Mining and Special Warefare Technology*, www.fas.org/irp/budget/fy98_navy/0602315n.html, pp. 1–9, no date.

Government Packet Information, *Micropower Impulse Radar (MIR)*, http://lasers.llnnl.gov/lasers/idp/mir/files/MIR_govt_info.html, pp. 1–17, no date.

Apogee Scientific, Inc., *Hydrocarbon Leak Detection System—An Innovative Method for Testing Hydrocarbon Leaks From Pipelines, Production and Storage Facilities, Landfills, and Coal–Seams*.

Karl A. Kappra, Francis Le, Lam Nguyen, Tuan Ton, Matthew Bennett, *Ultra–Wideband Foliage and Ground–Penetrating Radar Experiments*, pp. 1–4, no date.

* cited by examiner

METHOD AND SYSTEM FOR IDENTIFICATION OF SUBTERRANEAN OBJECTS

CROSS-REFERENCES TO RELATED APPLICATIONS

This application is a continuation-in-part application of application Ser. No. 09/680,745, entitled "RADAR CROSS-SECTION MEASUREMENT SYSTEM FOR ANALYSIS OF WOODEN STRUCTURES," filed Oct. 7, 2000 by Gilbert F. Miceli and Michael Parisi, now U.S. Pat. No. 6,246,355, which is a continuation-in-part application of application Ser. No. 09/745,329, entitled "RADAR CROSS-SECTION MEASUREMENT SYSTEM FOR ANALYSIS OF INSULATIVE STRUCTURES," filed Dec. 20, 2000, now U.S. Pat. No. 6,522,284, both of which are herein incorporated by reference in their entirety for all purposes, and both of which claim priority of Provisional Appl. No. 60/171,548, filed Dec. 22, 1999 and of Provisional Appl. No. 60/191,444, filed Mar. 22, 2000, both of which are also herein incorporated by reference for all purposes. Priority is also directly claimed to Provisional Appl. No. 60/191,444.

BACKGROUND OF THE INVENTION

The present invention relates generally to a method and system for identifying and analyzing subterranean objects. More particularly, the invention relates to a method and system for identifying and analyzing subterranean objects with a combination of radar and imaging techniques.

Various methods are known for detecting the presence of subterranean metallic objects. These known methods typically rely on an analysis of how an electromagnetic field is distorted by the presence of the object and may be broadly classified as frequency-domain and time-domain methods. One simple frequency-domain method uses transmission of a substantially sinusoidal signal with fixed frequency. The received signal is synchronously demodulated and passed through a low-pass filter to remove both noise and carrier-related signals. The phase of the demodulated received signal is synchronized with the phase of the transmitted signal. The presence of a conductive object produces a spatial discontinuity in the electromagnetic properties of the target volume, which produce sudden phase changes in the received signal.

A variation of this technique uses multiple-frequency detectors, in which at least two substantially sinusoidal signals are transmitted. An apparatus is configured to select linear combinations of reactive and resistive signals of at least two transmitted signals such that the mildly conductive ground components are substantially canceled, and/or the ironstone resultant ground vector is substantially canceled, while maintaining sensitivity to signals from target conductive objects.

An example of a time-domain method, in which the relevant signals are described in terms of their temporal evolution is pulse-induction metal detection. Such methods send a short pulse of high current into a search coil and produce a magnetic field. Thus, a transient magnetic pulse is used instead of a sinusoidally varying magnetic signal. As the current is terminated, the collapsing magnetic field generates a reflected pulse opposite in polarity and many times greater in amplitude than the original current pulse. This reflected pulse generates electric current in proximate conductive objects, which increase the decay time of the reflected pulse. The resulting change in slope of the reflected pulse's decay portion is converted to a DC potential proportional to the change in the duration of the reflected pulse. Some pulse-induction detectors employ a binary transmit-receive cycle in which the voltage applied to the transmission coil is equal for every transmission period and zero between transmission periods.

Such technology is adequate for detecting the presence of subterranean metallic objects, but is generally inefficient for covering large areas of land and is largely unable to discriminate between objects that meet defined criteria of interest and those that do not. For example, in the particular application where it is desired to detect unexploded ordnance, it is necessary to discriminate between live ordnance and metallic clutter. This is a particular problem since many unexploded-ordnance remediation sites are decommissioned firing ranges on military bases where there is significant debris from fragments of shattered projectiles. Furthermore, in applications such as the evaluation of subterranean pipelines, it is desirable not only to identify the location of a pipeline, but also to identify defects that may exist in the pipeline requiring repair before an actual rupture.

There is accordingly room for improving diagnostic identifications of subterranean objects and for introducing automation into the process. In addition, the cost for performing such diagnostic evaluations can be reduced significantly by such a system.

SUMMARY OF THE INVENTION

Embodiments of the invention thus provide a method and system for analyzing a subterranean volume. A radar source is configured on an airborne vehicle, such as a helicopter. An arrangement of at least one computer system is provided in communication with the radar source and configured to accept instructions from an operator and to operate the radar source. As the vehicle moves in the vicinity of the subterranean volume along a navigation path, a radar signal is propagated with the radar source into the subterranean volume. A reflected radar signal from a subterranean object within the subterranean volume is received. Physical characteristics of the subterranean object are ascertained from the reflected radar signal.

In one embodiment a laser mapping subsystem is also provided on the vehicle in communication with the computer arrangement. The laser mapping subsystem is used to map a ground surface of the subterranean volume.

In another embodiment, a global positioning system is provided on the vehicle in communication with the computer arrangement. The global positioning system is used to ascertain longitude and latitude positions for the subterranean object.

In a further embodiment, an inertial measurement unit is provided on the vehicle in communication with the computer arrangement. The inertial measurement unit is used to determine the actual motion of the vehicle and to compensate for that motion in analyzing the reflected radar signal to ascertain physical characteristics of the subterranean object.

In still a further embodiment, an infrared detector is provided on the vehicle in communication with the computer arrangement. The infrared detector is used to image the ground surface of the subterranean volume. Infrared radiation is detected from the ground surface and correlated with the reflected radar signal. The wavelength of the detected infrared radiation may be in a range between 3 and 5 $\mu$m or may be in a range between 8 and 12 $\mu$m.

In yet another embodiment, a visible-wavelength electromagnetic radiation detector, such as a charge-coupled device, is provided on the vehicle in communication with the computer arrangement to image the ground surface of the subterranean volume. Visible-wavelength electromagnetic radiation from the ground surface is detected. A signal is digitized from the detected visible-wavelength electromagnetic radiation. The digitized signal is correlated with the reflected radar signal.

In another embodiment, a magnetometer is provided on the vehicle in communication with the computer arrangement. The magnetometer is used to detect the subterranean object independently of the radar signal to decrease the level of false positives.

In an additional embodiment, a hydrocarbon leak detector is provided on the vehicle in communication with the computer arrangement. The hydrocarbon leak detector is used to detect hydrocarbon emission from the subterranean object, particularly in instances where the subterranean object is an underground pipeline that may have defects.

Identification of the subterranean object may be performed by the computer arrangement with a trained evaluation system, such as a neural net or an expert system. Evaluating whether the subterranean object contains a structural anomaly may be performed by comparing the ascertained physical characteristics with expected characteristics. The subterranean object may be a portion of a pipeline or may be unexploded ordnance in different embodiments.

BRIEF DESCRIPTION OF THE DRAWINGS

These and other embodiments of the present invention, as well as its advantages and features are described in more detail in conjunction with the text below and the attached figures, in which similar reference numerals are used throughout the several drawings to refer to like elements. Various components of the same type may be distinguished by following the reference label with a hyphen and a second label that distinguishes among the components.

FIG. 5(a) shows a top view where defects in a subterranean pipeline are analyzed and FIG. 5(b) shows a top view where objects distributed in an area are analyzed;

DESCRIPTION OF THE SPECIFIC EMBODIMENTS

Embodiments of the invention include a radar cross-section measurement system for the analysis of subterranean objects, such as underground pipelines or unexploded ordnance. In accordance with one embodiment, an airborne vehicle, such as a helicopter or other aircraft, is operated in the vicinity of the subterranean objects to be examined, systematically making appropriate radar measurements of the subterranean objects. The measurements are used by a computational analysis system to (1) identify the presence of a subterranean object having defined identification criteria and (2) determine the existence and location of any anomalies within any of the identified subterranean objects. A report of the results is prepared and forwarded to a client.

Figure 1:
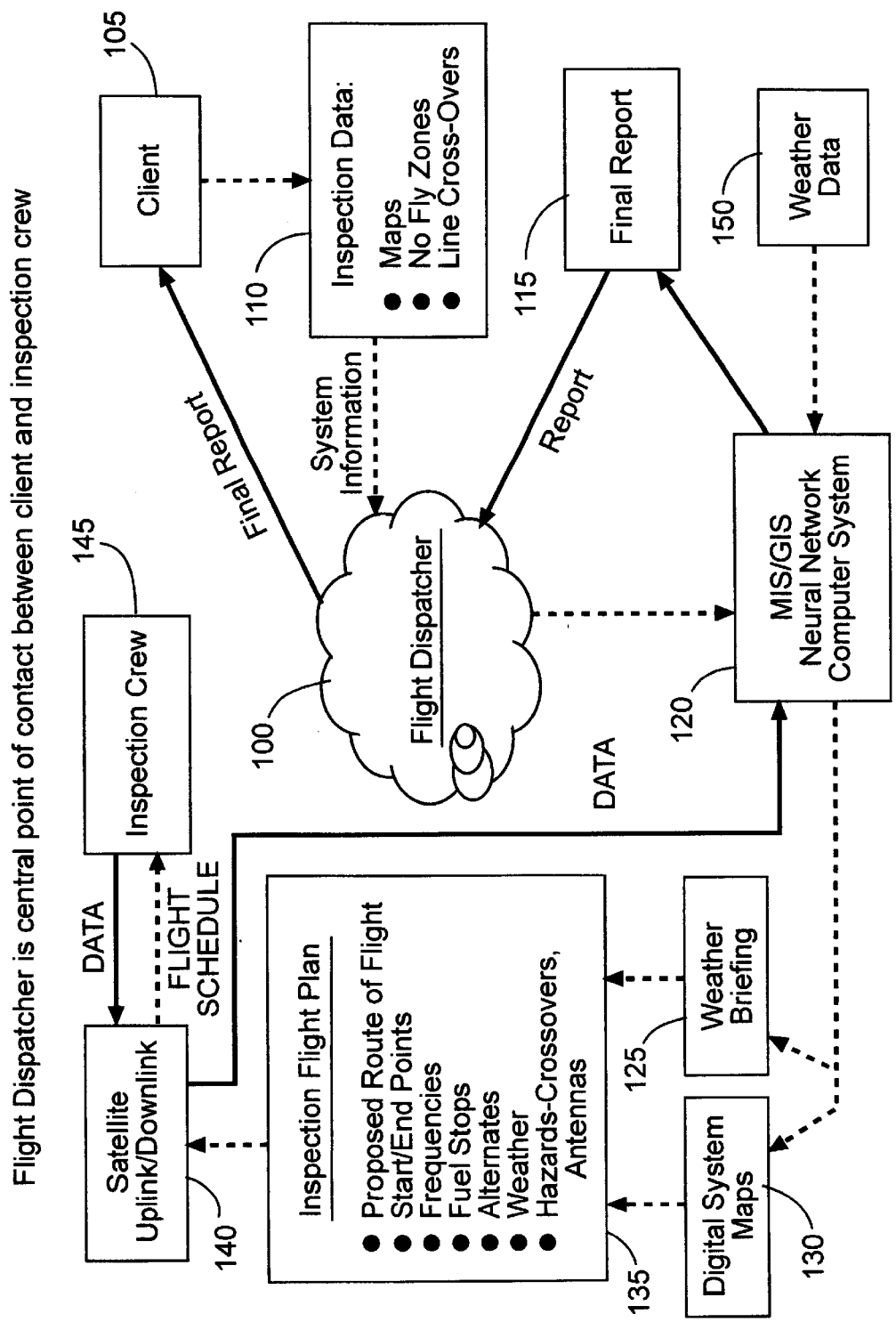
FIG. 1 is a block diagram showing the relationship between various elements of the system in one embodiment of the invention.

The overall structure of one such system is illustrated in FIG. 1 in the form of a block diagram showing in particular the flow of data through the system. The system functions centrally with a dispatcher 100 who is responsible for coordination of various other aspects of the system. In operation, a client 105 requests a report identifying and/or analyzing certain subterranean objects 1000. The subterranean objects 1000 may generally be comprised of conductive or insulative components. Examples of subterranean objects 1000 that may be identified and/or analyzed include pipelines and unexploded ordnance, among others. Pipelines may have structural defects that weaken the integrity of the pipeline and which the system may identify for repair before leakage of the pipe. Unexploded ordnance may be characterized by the shape of components that make up the ordnance to distinguish it from other similarly sized clutter in the area.

The dispatcher collects system information in the form of inspection data 110. Such inspection data 110 may be provided by the client or obtained from other sources to define the area to be studied and to identify the specific location of the subterranean objects 1000 to be analyzed if their location is known, as may be the case for underground pipelines. For example, to identify the area to be studied, the inspection data 110 may include, among other information, maps of the region, information identifying any known structures that may exist in the region, and information identifying zones where the inspection vehicle 12 (not shown in FIG. 1) is excluded, such as no-fly zones in those embodiments where the inspection vehicle 12 is an aircraft. In the United States, flight-plan data may be obtained from such sources as the Federal Aviation Administration (FAA) or the Aircraft Owners and Pilots Association (AOPA).

Relevant inspection data 110 are provided by the dispatcher 100 to an analysis system 120, which may perform various functions as necessary in the system and as described in greater detail below. As part of one such function, the analysis system 120 combines inspection data 110 with other data relevant for formulating an inspection plan 135. Such other data may also be provided by the dispatcher 100 or may be obtained directly from another source. One example of such relevant other data shown in FIG. 1 as being obtained directly from an external source is weather data 150 describing the existing and/or expected weather conditions in the region of the subterranean objects 1000 to be analyzed. The invention encompasses the use of other data sources relevant to the formulation of an inspection plan 135, such as the locations of hotels, the locations of rental-car companies, the layouts of nearby airports, and others as may occur to those of skill in the art.

In this aspect of the invention, the analysis system 120 acts as a module that uses such information sources to formulate the inspection plan 135. In embodiments using an aircraft as the inspection vehicle 12, the inspection plan 135 may be equivalent to a flight plan for the aircraft. The inspection plan 135 includes such features as a proposed inspection route, including starting points, end points, possible fuel stops, and a list of known possible hazards to the vehicle 12. In addition, the inspection plan 135 may include one or more alternative routes to be followed by the inspection vehicle 12 in the event some barrier to completing the proposed inspection route is encountered. The analysis system 120 may also provide digital system maps 130 and/or a weather briefing 125, each of which may additionally be included in the inspection plan 135. The inspection plan 135 may also include other relevant information communicated by the analysis system 120 that may be useful during the inspection.

The inspection is performed by navigating the inspection vehicle 12 in the vicinity of the subterranean objects 1000, such as shown in greater detail in FIG. 2 (described below). The inspection vehicle 12 is occupied by an inspection crew 145 which obtains information describing the inspection plan 135 via a satellite link 140 or equivalent communications device. The inspection crew 145 may obtain any of the additional information described above as necessary or desired during its actual navigation around the subterranean objects.

As the inspection vehicle 12 is navigated in the region of the subterranean objects 1000, it performs radar cross-section measurements, described in detail below, collecting signal data that are then provided to the analysis system 120. Such signal data may be provided via the satellite link 140, although alternative methods for providing such data are within the scope of the invention, some of which are described further below. The analysis system 120 uses the received signal data to generate a final report 115, which provides information in summary format identifying the locations of the subterranean objects 1000 detected by the system, as well as any structural anomalies that have been found for those applications where it is relevant. The final report 115 is communicated back to the dispatcher 100, who may review it and forward it to the client 105 for action as the client 105 determines is appropriate. Such actions may include repairing underground pipelines where structural anomalies have been found in the pipelines, or removing unexploded ordnance where it has been identified by the analysis system 120.

While FIG. 1 and the above description depict a single analysis system 120 and a single satellite link 140, it will be understood that the multiple functions performed by these elements of the system may alternatively be performed by equivalent multiple elements without exceeding the scope of the invention.

Figure 2:
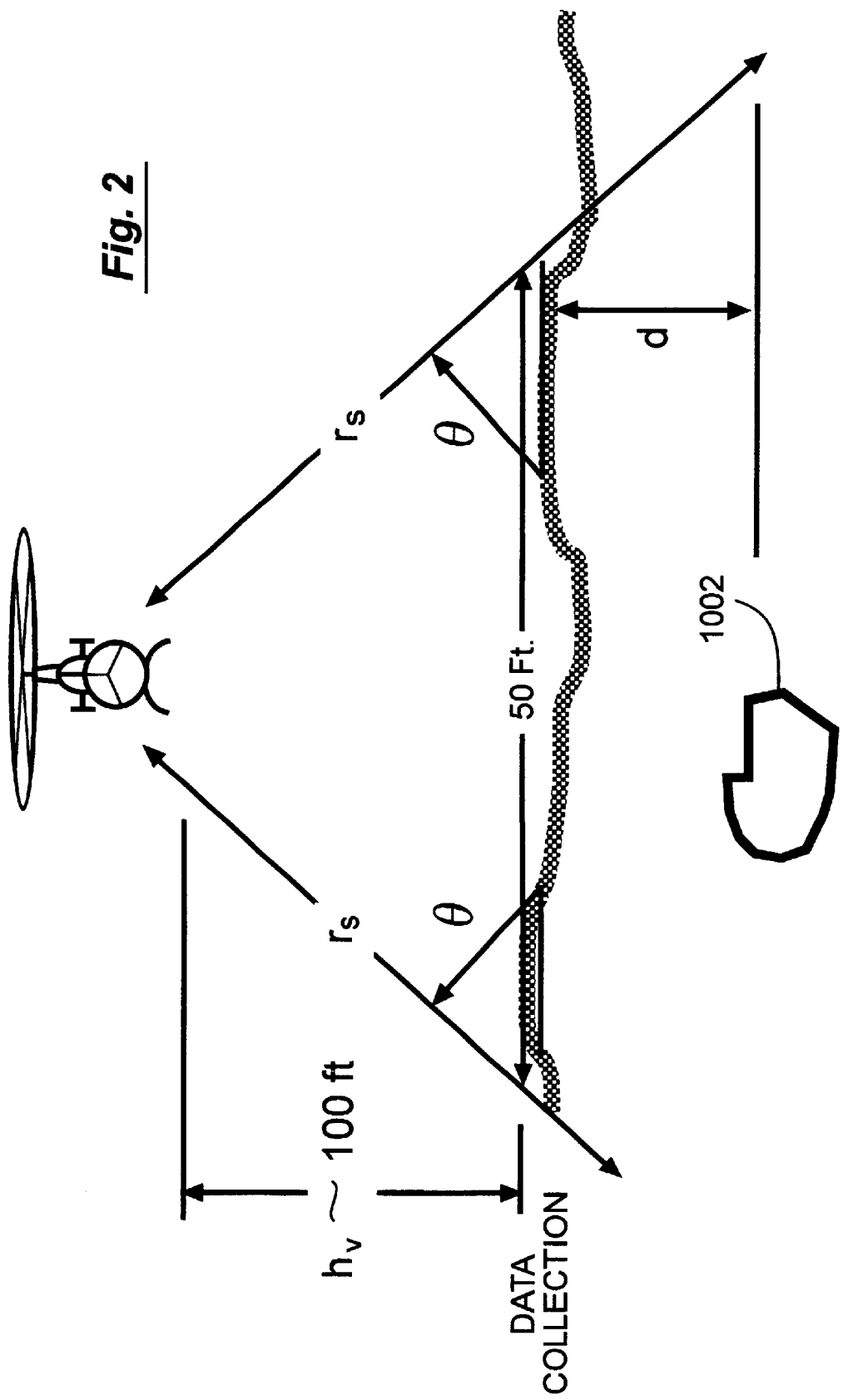
FIG. 2 is a schematic diagram of a side view of a navigational path that may be taken by the inspection vehicle when taking radar cross-section measurements of subterranean objects.

An example of the navigation performed by the inspection vehicle 12 is shown in FIG. 2, in which the inspection vehicle 12 is depicted as a helicopter. The inspection vehicle 12 follows a plurality of parallel inspection paths 202 to cover the entire area to be studied. For each inspection path 202, a transverse distance on the order of a hundred feet can be examined, so the number of such parallel inspection paths to be followed will necessarily depend on the area of the region to be studied. The various distances in the arrangement are intended to be exemplary since other orientations may be used as appropriate to obtain supplementary data. In the illustrated orientation, a subterranean object is located at a depth d under the surface within the inspection scope of the inspection vehicle 12. As is evident from the description of the operation of different components of the system below, different depths d and different surface differences from the inspection vehicle 12 may be readily accommodated to search the inspection region effectively. In one embodiment, the inspection vehicle 12 may be positioned at a height of about 100 feet. At such a height, the coverage of angle θ may be about ±30°.

Figure 3:
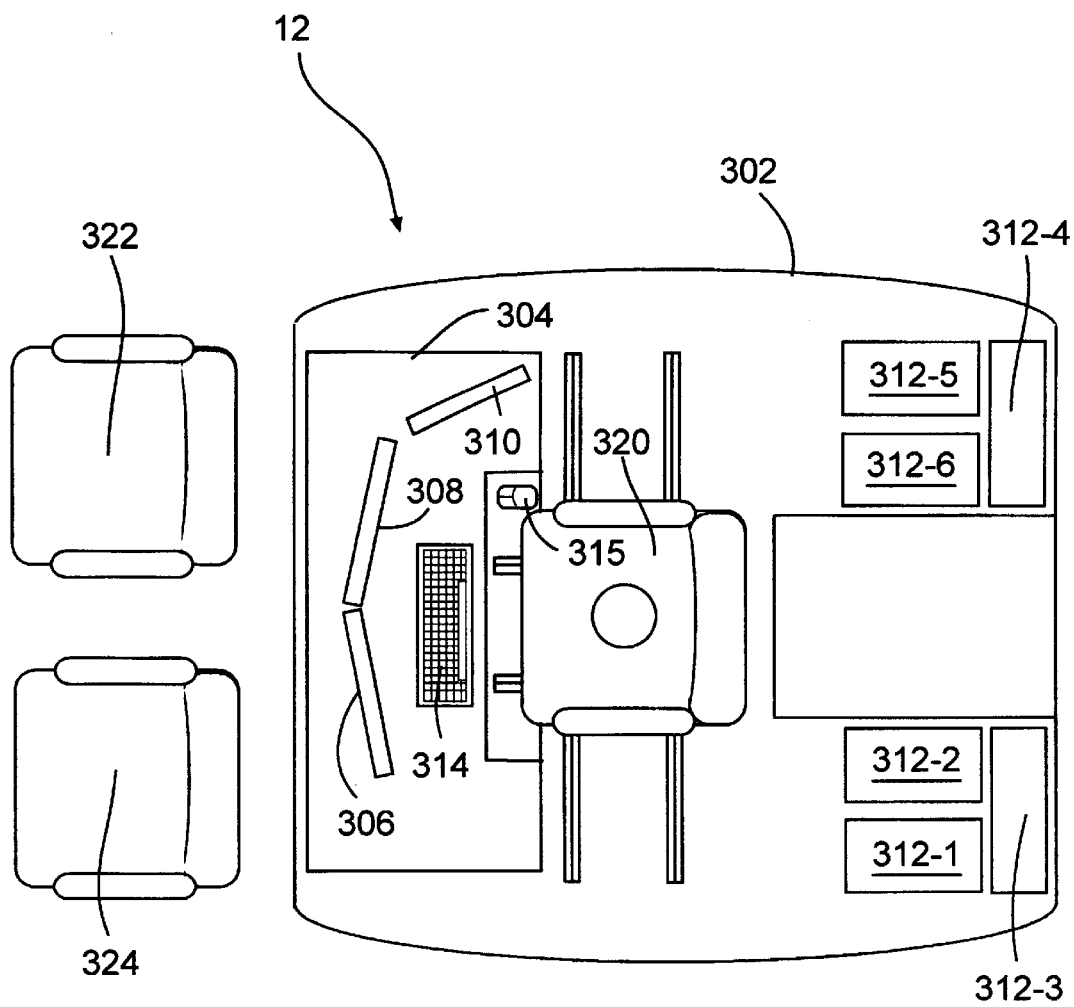
FIG. 3 illustrates one configuration that may be used to equip a navigation vehicle to operate in accordance with an embodiment of the invention.

An example of a radar workstation that may be configured within an inspection vehicle 12 is shown in FIG. 3. The particular configuration illustrated is appropriate, for example, for a helicopter such as an MD Explorer 902 or a Bell Textron 212, 412, or 427 helicopter. The forward compartment of the vehicle includes seat positions 322 and 324 for a pilot and copilot, who navigate the inspection vehicle 12 along the inspection paths 202. Such navigation is performed in accordance with instructions from an inspection technician 146 (not shown in FIG. 3) occupying seat 320 in a passenger compartment 302 of the inspection vehicle 12. The pilot, copilot, and inspection technician may constitute the inspection crew 145. The inspection technician 146 is equipped with an inspection station 304 from which he monitors results of the inspection on output interaction devices 306, 308, and 310, shown in the exemplary embodiment as computer screens, and issues instructions through input interaction devices 314 and 315, shown in the exemplary embodiment as a keyboard and mouse.

Figure 4:
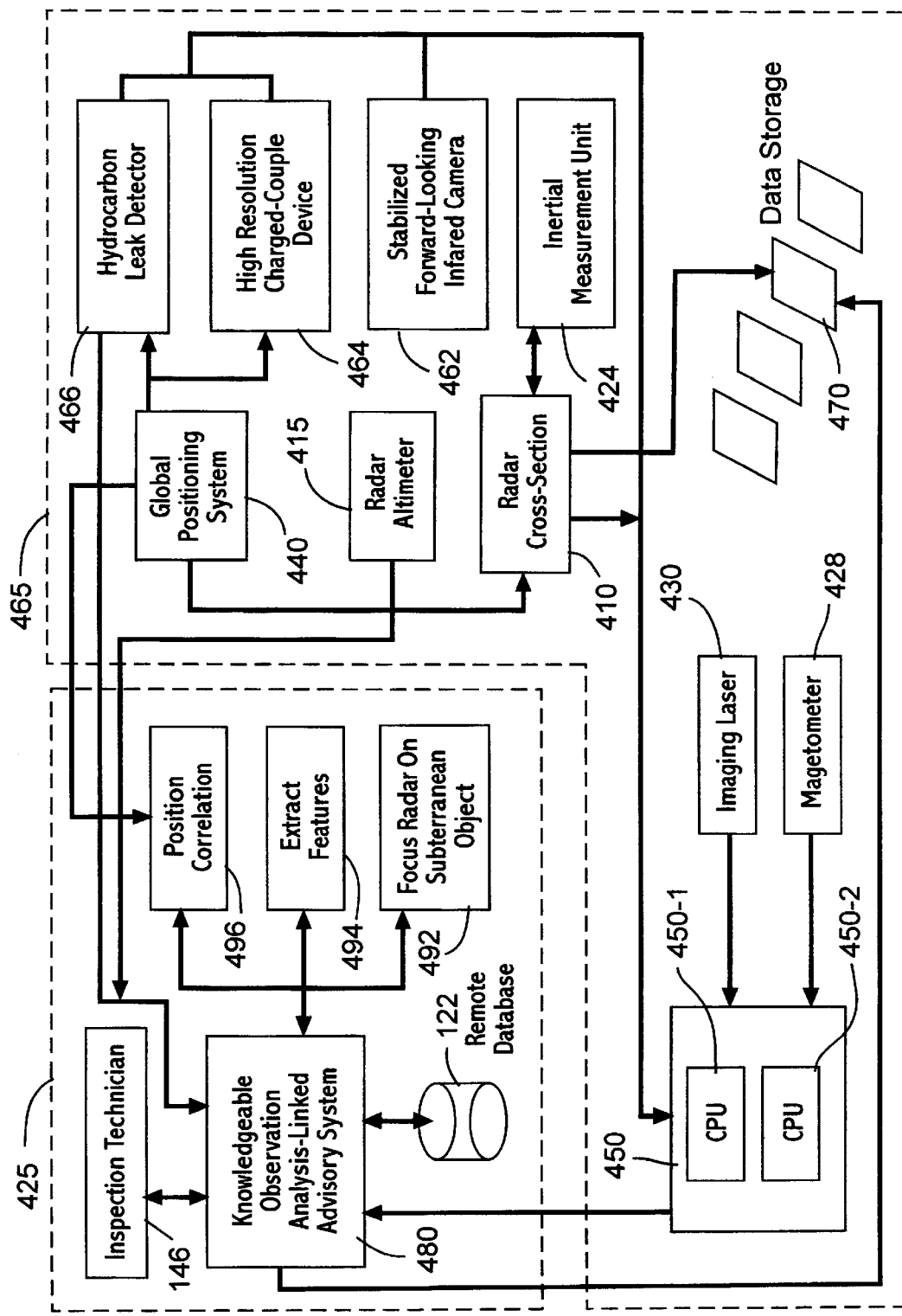
FIG. 4 is a block diagram showing the relationship between various subsystem elements used in analyzing the subterranean objects.

The interior of the passenger compartment is additionally equipped with various analytical devices and instruments, which may be positioned in locations designated generally by reference numeral 312. The illustration shows one arrangement that may be used for including six individual pieces of equipment. For particular applications, various components may be substituted and the configuration changed. In one embodiment, the equipment includes the following, the operational interconnection of which is shown in FIG. 4: (1) a radar cross-section subsystem 410 including an antenna and associated hardware for propagating and receiving radar signals; (2) a laser pointing and measuring subsystem 430; (3) a differential global-positioning subsystem (GPS) 440; (4) a radar altimeter 415; (5) a hydrocarbon leak detector 466; (6) a magnetometer 428; (7) an inertial measurement unit 424; (8) one or more central processing units (CPUs) 450 for executing software as necessary to operate the various subsystems in combination; (9) a stabilized forward looking infrared subsystem 462; (10) a high-resolution charge-coupled device 464; and (11) a data-storage subsystem 470 for storing relevant data as needed to operate the various subsystems in combination. In addition, the inspection vehicle 12 may include peripheral components used to insure proper and adequate functioning of the equipment 312. Such peripheral components may include, among others, stabilization platforms for the radar subsystem antenna and laser, power conversion transformers to convert from direct to alternating current (e.g., 24 V dc to 120 V ac), and battery backups as needed.

The interconnection of these various subsystems is shown in block-diagram form in FIG. 4. The figure is divided into two primary sets: analysis elements 425 and subsystem elements 465. The analysis elements include the inspection technician 146, the Knowledgeable Observation Analysis-Linked Advisory System (KOALAS) 480, and a remote database 122 accessible by the fixed remote analysis system 120. Three functions performed as the inspection vehicle 12 follows the navigation path 202 in the illustrated embodiment include: (1) focussing 492 relevant subsystem elements on the subterranean region containing the underground structures to be identified and/or analyzed; (2) extracting 494 features from each of the relevant underground structures so as to identify the structure or to determine whether the structures contain any anomalies; and (3) correlating 496 the location of those features to determine the location of the structure absolutely with respect to ground position and to specify the location of any anomalies with respect to the position of the structure.

The inspection technician 146 interacts with the KOALAS system 480 through the CPU subsystem(s) 450 to control the subsystems 465 to perform such functions. For example, during a passage of the inspection vehicle 12 along the navigation path 202, the KOALAS system 480 activates the laser subsystem 430, which is used for providing an accurate topographical map of the area being imaged. This map, when combined with the radar data collected as described below, provides an accurate depth of detected objects below the surface of the ground and the depth of vegetation in the area. The latitude and longitude positions of the inspection vehicle 12 are known from the GPS subsystem 440. With the topographical map provided by the laser subsystem 430, the KOALAS system 480 performs the step of correlating positions 496 and thereby calculates the latitude and longitude positions of each subterranean object studied for unique identification of those subterranean objects in the final report 115.

In one embodiment, the radar cross-section subsystem 410 uses an ultra wideband pulse of greater than 1.9 GHz from 100 MHz to 2 GHz linearly swept to provide accurate downrange resolution with ground penetrating capability. Processing as described below provides high resolution in the cross range. The radar altimeter 415 is used to provide accurate altitude information for underground focusing and object detection. In addition to providing accurate correlation of positions of detected objects to latitude and longitude positions, the global positioning subsystem 440 is also used to provide a reference to remove inertial measurement drift, which is accurately measured by the inertial measurement unit 424. In particular, the inertial measurement unit 424 provides data defining the movement of the inspection vehicle 12, such as accelerations and rates of acceleration. These data are used in the radar analysis to compensate for randomness resulting from vehicle motion and thereby also to improve image focusing. Information is relayed back continuously to the KOALAS system 480, where it can be accessed by the inspection technician 146 for modifying the inspection path 202 as may be necessary. The KOALAS system 480, in conjunction with the inspection technician 146 uses that information to steer the radar antenna in a direction towards the candidate subterranean object.

The stabilized forward-looking infrared subsystem 462 is used as an additional discrimination sensor in some embodiments to provide ground truth data image overlay in conjunction with both the radar and laser data. Heat, or the lack of it as compared to surrounding areas, as detected by the infrared subsystem 462 is used as a filter to compensate for emittence and reflectivity characteristics of the ground. The infrared subsystem 462 may be configured to respond to wavelength ranges of 3–5 $\mu$m or 8–12 $\mu$m depending on the ambient conditions. A high-resolution stabilized charge-coupled device color camera 464 may also be provided for additional discrimination. As in the use of the infrared subsystem 462, the charge-coupled device 464 acts as a visible-light camera to detect surface ground objects that might be responsible for providing the system with a false-positive response. This is accomplished by using the digital output of the camera hues and saturation spectrum.

The subsystems may also include auxiliary sources for the detection of subterranean objects for particular applications. For example, for the detection of defects in pipelines, the inspection vehicle may be equipped with a hydrocarbon leak detector 466, such as provided, for example, by Apogee Scientific, Inc. ("Apogee") in Englewood, Colo. A hydrocarbon leak detector uses a multiple-channel gas monitors configured, for example, simultaneously to measure methane, total hydrocarbons, and carbon dioxide. The device provided by Apogee has detection limits less than 1 ppm for all three measurements and has monitoring rates of up to 100 samples per second. The Apogee device is also configured for mounting to airborne vehicles such as helicopters and may be used at altitudes ranging from 20–150 feet.

In applications involving the detection of buried metallic objects, such as unexploded ordnance, a magnetometer 428 may provide a second detection source. A magnetometer is a device configured to measure variations in the earth's magnetic field and various designs will be known to those of skill in the art. In one design sensitive to proton precession, the magnetometer operates on the principle that the proton spin axes of atoms are aligned with the geomagnetic field. The introduction of an artificial magnetic field source causes a precession that may be correlated with the artificial magnetic field strength. Data from this sensor is fused with the other sensor data to increase the probability of detection and to decrease the probability of false-positive responses.

In order to discriminate the properties of candidate subterranean objects to identify them and to ascertain whether they contain anomalies, the radar cross-section subsystem 410 uses a technique in which interferometric techniques are applied to account for the motion of the inspection vehicle 12 along the navigation path 202, thereby also increasing the effective spatial resolution of the system. The information thus obtained is used to perform the step of extracting features that describe the subterranean object, including identification of possible anomalies.

The system may thus be configured for analysis of a variety of different subterranean objects. Two specific examples are provided. In the first example, it is desired to perform an inspection of subterranean pipelines. Accordingly, the inspection data 110 may include information defining the position of pipelines to the extent known. The presence of a pipeline may be verified by ascertaining whether a candidate object has the cylindrical shape of a pipe. The system may be configured to identify structural weaknesses in the pipeline according to differences in density. In the second example, it is desired to inspect an area for unexploded ordnance. Once a candidate object has been identified, it may be classified as unexploded ordnance by determining its size and shape, and comparing the determined size and shape with a catalog of size and shape characteristics of intact ordnance to discriminate from other metallic clutter.

Figure 5A:
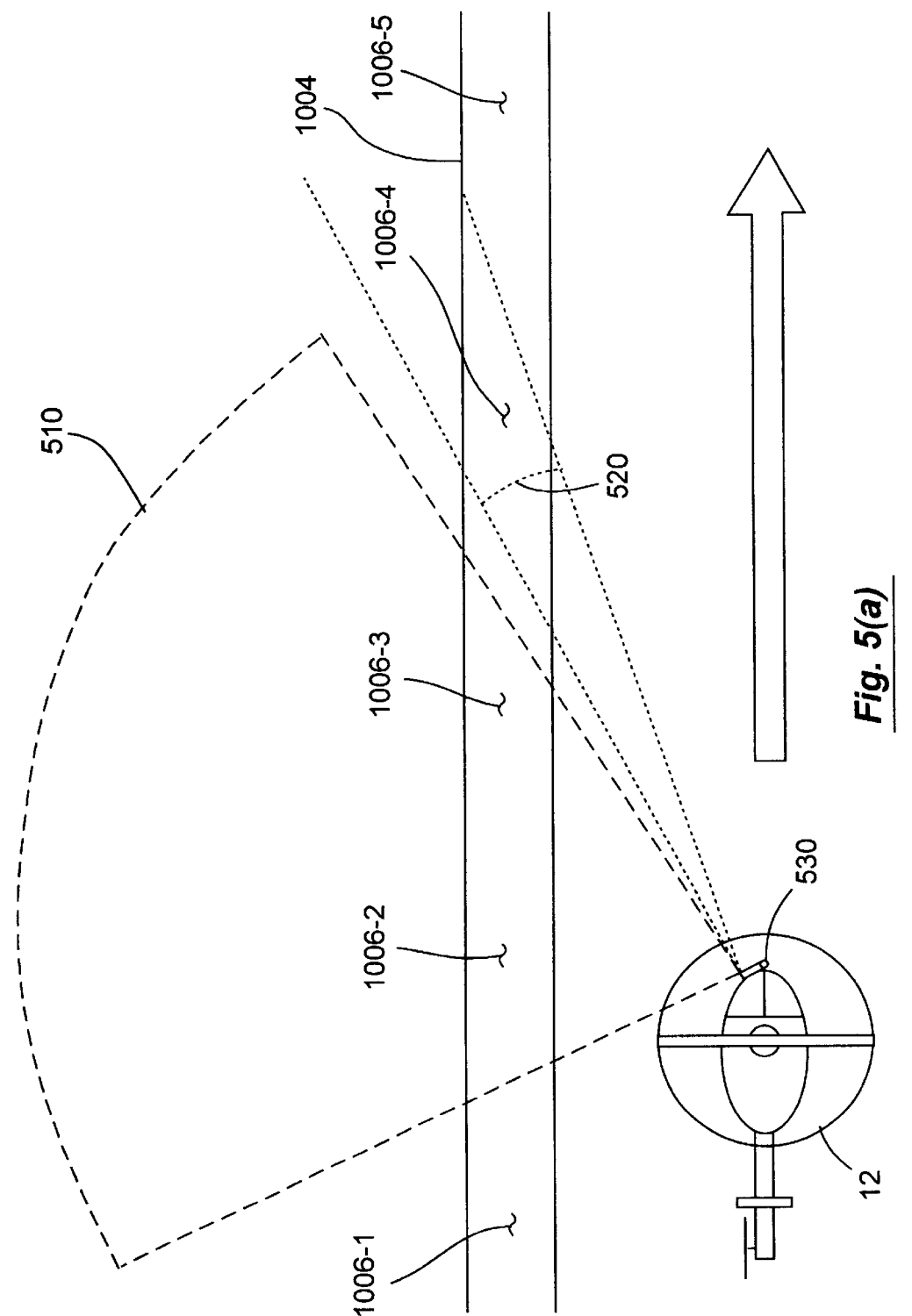
FIGS. 5(a) and 5(b) are a schematic diagram showing the interaction of various sensor signals with subterranean objects.
Figure 5B:
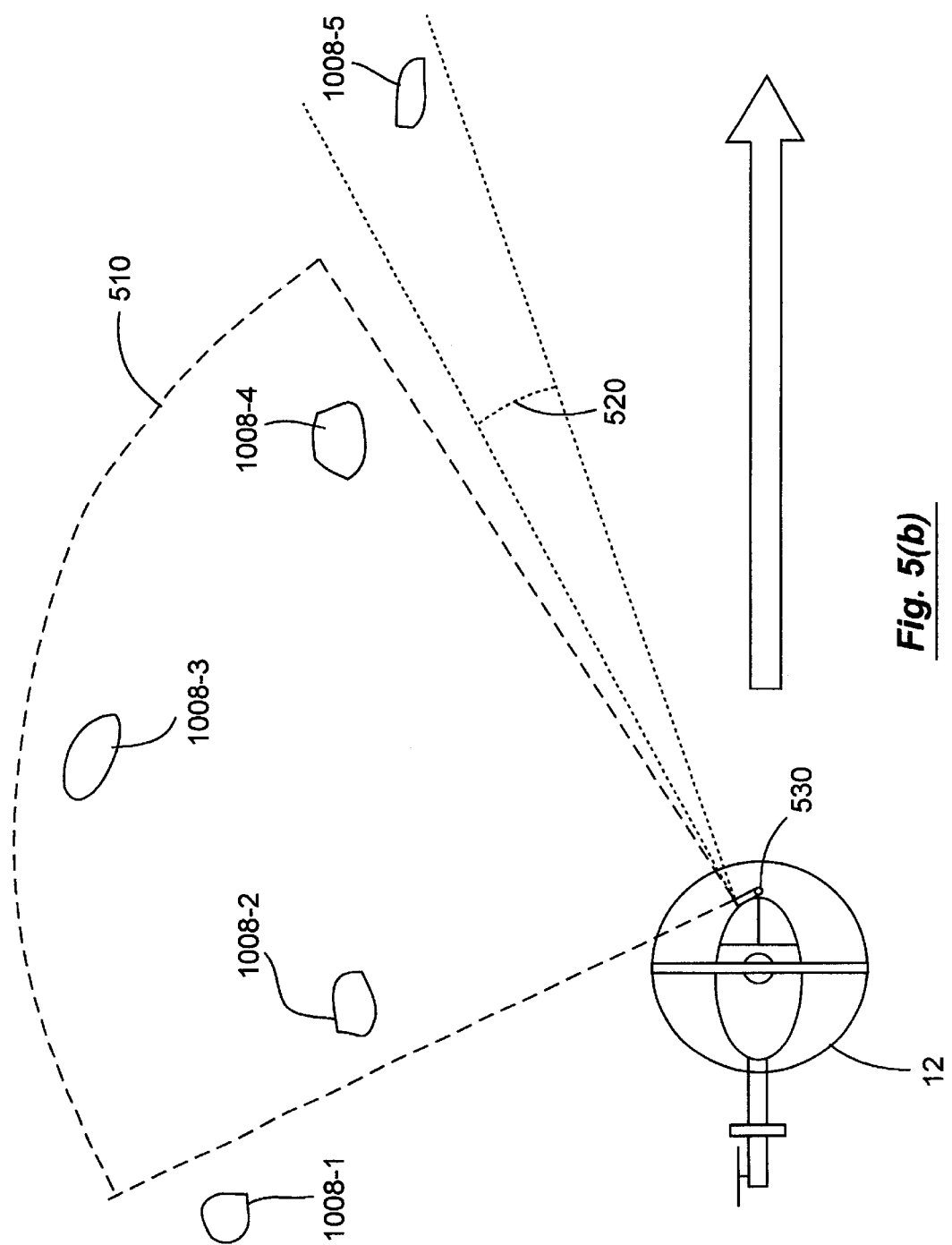

The physical arrangement of signals that are used for each of these two examples may be understood more clearly with reference to FIGS. 5(a) and 5(b), which show top views for a pipeline identification in part (a) and for an unexploded-ordnance identification in part (b). In both cases, as the inspection vehicle 12 moves along navigation path 202, signals are transmitted from a rotatable nose mount 530. For example, the radar cross-section signal 510 (long-dashed - - -) is transmitted continuously as the inspection vehicle 12 follows the navigation path 202. The radar cross-section subsystem 410 sends out a broad band pulse that is compressed upon reception. This signal is also integrated into the subsequent analysis. The stabilized forward-looking infrared signal 520 is shown as a dotted line (••••••). The coherent laser signal is not shown since it is used in mapping the area by pointing approximately downwards from the inspection vehicle 12. In FIG. 5(a), the system is configured both to verify the existence of the subterranean pipeline 1004 and to identify and structural anomalies 1006 in the pipeline 1004. In FIG. 5(*b*), the system is configured to identify and discriminate a variety of unexploded ordnance 1008 from other clutter over a surface area.

After the data have been captured and stored onboard in the data storage system 470, a preliminary data reduction may be used to filter noise and thereby control the amount of data captured. Without such preliminary data reduction, approximately one terabyte of information may be collected during a typical six-hour inspection day. The filtered data are transmitted to the analysis system 120 for more complete processing. Such data may be provided to the analysis system 120 in different ways. In one embodiment, data is written to a magnetic or optical recording medium, such as a CD or tape, and is physically transported to the analysis system 120. In another embodiment, the satellite link 140 (shown in FIG. 1) is used to transmit data. In one embodiment, the on-board KOALAS system 480 includes sufficient software to make a preliminary estimate identifying the subterranean object and any anomalous features. Such software is a subset of the software described below used by the fixed remote analysis system 120 in its more detailed analysis, but permits a preliminary evaluation identifying the properties of the subterranean object for the inspection technician 146. Under such circumstances, the inspection technician 146 may make interactively determine whether the entire structure was captured for analysis or whether a return inspection may be necessary.

In one embodiment, the following information is provided for use by the inspection technician 146 on the output interaction devices 306, 308, and 310. On a first of the devices 310 is displayed a moving map, indicating the present position of the inspection vehicle 12. On a second of the devices 306 is displayed identification information for each subterranean object identified. Such information may include its physical dimensions, as well as latitude and longitude positions. On a third of the devices 308 is displayed preliminary results of the radar analysis, permitting the inspection technician to decide whether to make additional measurements from different angular positions or to proceed along the navigation path.

Figure 6:
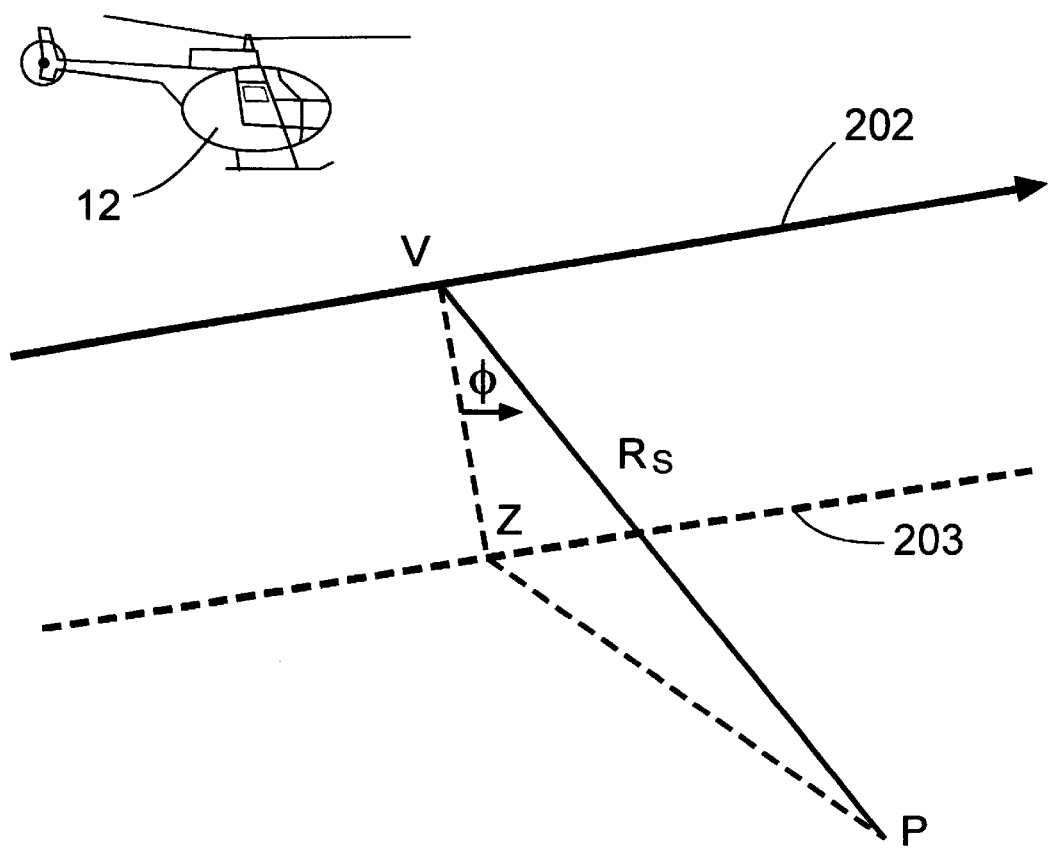
FIG. 6 is a representation of a cylindrical coordinate system.

The radar cross-section measurement system makes use of interferometric analyses to improve resolution, with measurements being taken at intervals as the inspection vehicle 12 moves along the navigation path 202. The resolution characteristics of the broad band mode may be understood by considering an analysis using a cylindrical coordinate system such as shown in FIG. 6. A cylindrical coordinate system naturally matches side-looking radar operations. In the figure, the inspection vehicle 12 at point V makes a measurement of a radar signal reflected from point P. The position of P is defined by the coordinates $(r_s, \phi, z)$, with $r_s$ being the slant range, $\phi$ being the look angle, and z being the azimuth (i.e. the distance between navigation path 202 and the nadir 203 projected on the surface of the earth).

For a radar system transmitting electromagnetic pulses of time duration $\tau$, the sensor range resolution is $\Delta r = c\tau/2 \approx c/2\Delta f$, where the time duration $\tau$ is approximately the inverse of the bandwidth $\Delta f$. The range resolution may improved be with a reduced pulse width $\tau$ and high peak power for a prescribed mean power operation.

The azimuthal resolution is dictated by the constraint that two points at a given range not be within the radar beam at the same time. Accordingly, the azimuthal resolution $\Delta z$ is related to the radar beamwidth by the relation $\Delta z \approx r\lambda/L$, where r is the slant range and L is the effective antenna dimension along the azimuthal direction, i.e. along the navigation direction 202 in the configuration illustrated in FIG. 6. In the radar cross-section measurement system used in embodiments of the invention, the effective antenna dimension is increased by the motion of the inspection vehicle 12 and by coherently combining the backscattered echoes received and recorded along the navigation path 202.

Thus, for 2N+1 equally spaced positions of the antenna, located at $V_n$ ($x_n$=nd, r=0), and a point target P ($r_s$, $\phi$, 0), and isotropic radiation by the antenna within its beam width to provide an illuminated patch $X=\lambda r/L$, the azimuthal-dependent part of the backscattered signal is given by $$A(nd) = e^{-i(2\pi/\lambda r)(nd)^2}.$$

In deriving this result, the expression $$\sqrt{r^2+(nd)^2} \approx r+(nd)^2/2r$$

has been used. The received signal is processed by summing over all antenna positions and convolving with the azimuthal reference function $$g(nd) \approx e^{i(2\pi/\lambda r)(nd)^2}$$

to give $$\hat{A}(nd) = \sum_{k=-N}^{N} e^{-i(2\pi d^2/\lambda r)k^2} e^{i(2\pi d^2/\lambda r)(n-k)^2} \approx \frac{\sin\left(\frac{2\pi Xd}{\lambda r}n\right)}{\sin\left(\frac{2\pi d^2}{\lambda r}n\right)} (nd \ll X).$$

As for the range results, the image of a point target is spread out. In the neighborhood of the target position at z=0, $$\hat{A}(nd) \approx \sin c(\pi nd/\Delta z),$$

so that a distributed target is accounted for by superposition according to the reflectivity pattern in the azimuthal direction $\gamma$ (z):

$$\hat{\gamma}(nd) = \int dz \gamma(z) \hat{A}(nd-z) = \int dz \gamma(z) \sin c[\pi(nd-z)/\Delta z],$$

where the azimuthal resolution is $\Delta z = L/2$. Because the spatial bandwidth of estimated reflectivity $\gamma$ is determined by the sin c function to be $1/\Delta z$, the processed signal for any position along the navigation path 202 is determined by sampling interpolation:

$$\hat{\gamma}(z) = \Sigma \gamma(nd) \sin c[\pi(z-nd)/\Delta z] = \int dz' \gamma(z') \sin c[\pi(z-z')/\Delta z].$$

For broad-band radar analysis, a similar result follows for the range. Thus, combining the range and azimuthal results provides the following overall image expression for radar signals reflected off an object having a two-dimensional reflectivity pattern $\gamma$ (z,r):

$$\hat{\gamma}(z,r) = \int\int dz' dr' \gamma(z,r) \sin c[\pi(z-z')/\Delta z] \sin c[\pi(r-r')/\Delta r].$$

As noted, such analysis then provides a resolution capability for the radar system of $\Delta r$ in the range direction and of $\Delta z$ in the azimuthal direction.

Figure 7:
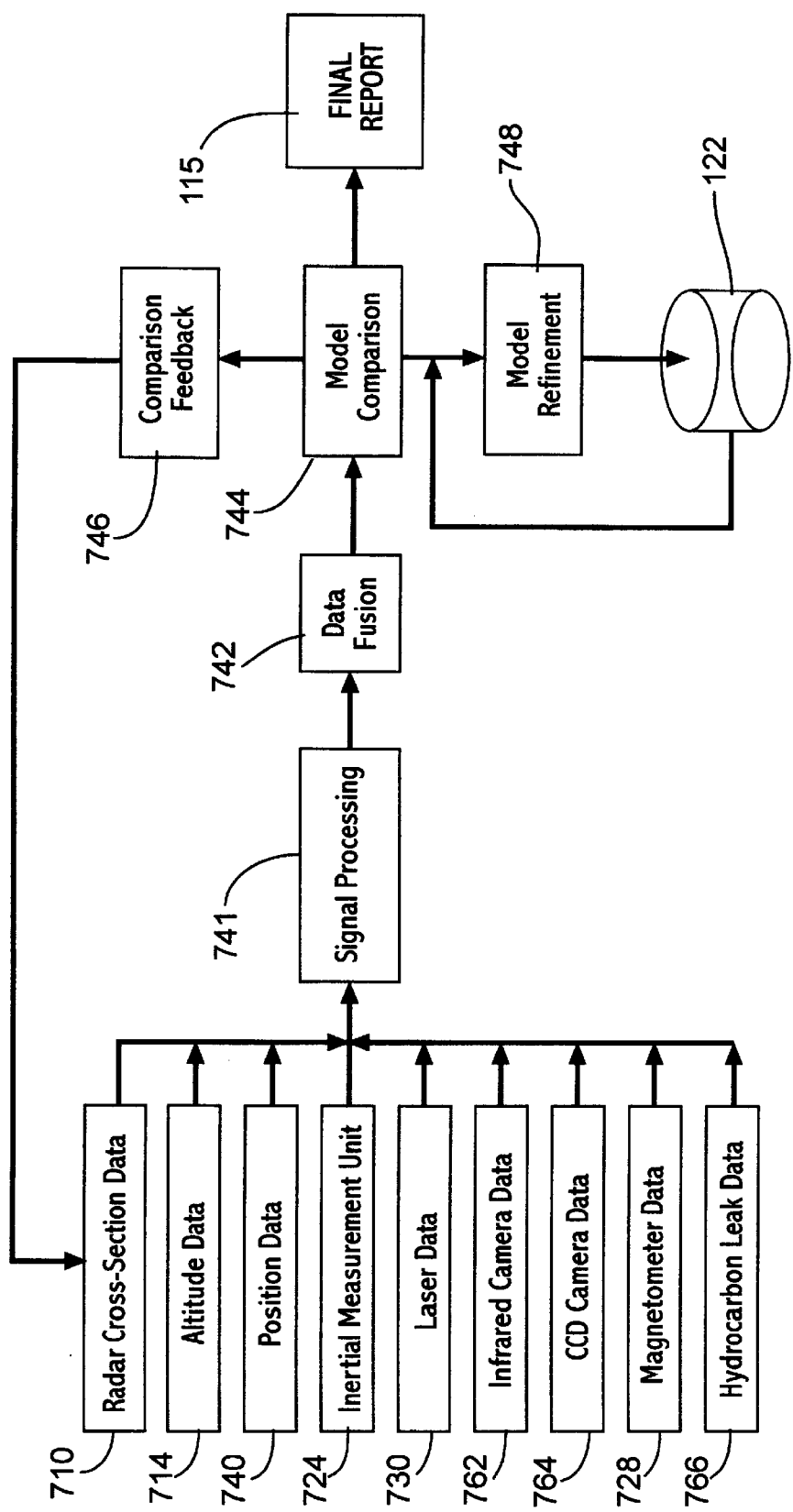
FIG. 7 is a block diagram showing the analysis of collected data.

A detailed overview of the analytical processing of the collected data is provided in FIG. 7. The various forms of data collected with the investigation vehicle 12, including radar cross-section measurement data 710, altitude data 714, position data 740, inertial measurement data 724, laser data 730, infrared data 762, CCD data 764, magnetometer data 728, and perhaps others, are subjected to a signal processing step 741 such as described in detail above. The various data are subject to data fusion 742, which is a method for combining results to increase the confidence level of the results presented in the final report 115. As an illustration, when the system makes a determination that characterizes a feature in a subterranean object as being consistent with certain properties of the object, such as being unexploded ordnance or being an anomalous part of a pipeline the reliability of the determination is increased by calculating the product of probabilities from different sources. For example if $p_k$ is the probability that of given feature based on results from technique k, then the probability P that the feature has been properly identified on the basis of multiple techniques is $$P=1-\Pi(1-p_k)$$

The assignments of structure identifications or recognition of anomalies is performed in various embodiments at step 744 with an evaluation system that has been trained to make such determinations according to the results of the measurements, such as with an expert system or neural network configuration. Such an evaluation system may rely on knowledge of the characteristics expected in different, relevant, types of structures as stored in database 122, the generation of which is further described below. For example, in cases where the system is configured to analyze subterranean pipelines, the expert system will have stored the density characteristics that define whether features are normal or anomalous and will have stored radar scattering signals that correspond to such densities. In cases where the system is configured to identify unexploded ordnance, the expert system will have stored the sizes and shapes that define such subterranean structures and will have stored radar scattering signals that correspond to such sizes and shapes.

The radar signals reflected from a particular subterranean object 1000 may be analyzed to identify, for example, size, shape, and density characteristics of the subterranean object. Information characterizing the interior of the subterranean structure may be obtained by using radar signals having a frequency that penetrates the material of that structure, generally between 100 MHz and 2 GHz. Defects within the individual structures may be manifested by density changes or by the change in reflective characteristics that result from the defect. Thus, a crack within a pipeline, for example, causes a change in density that may be recognized as described below.

Figure 8:
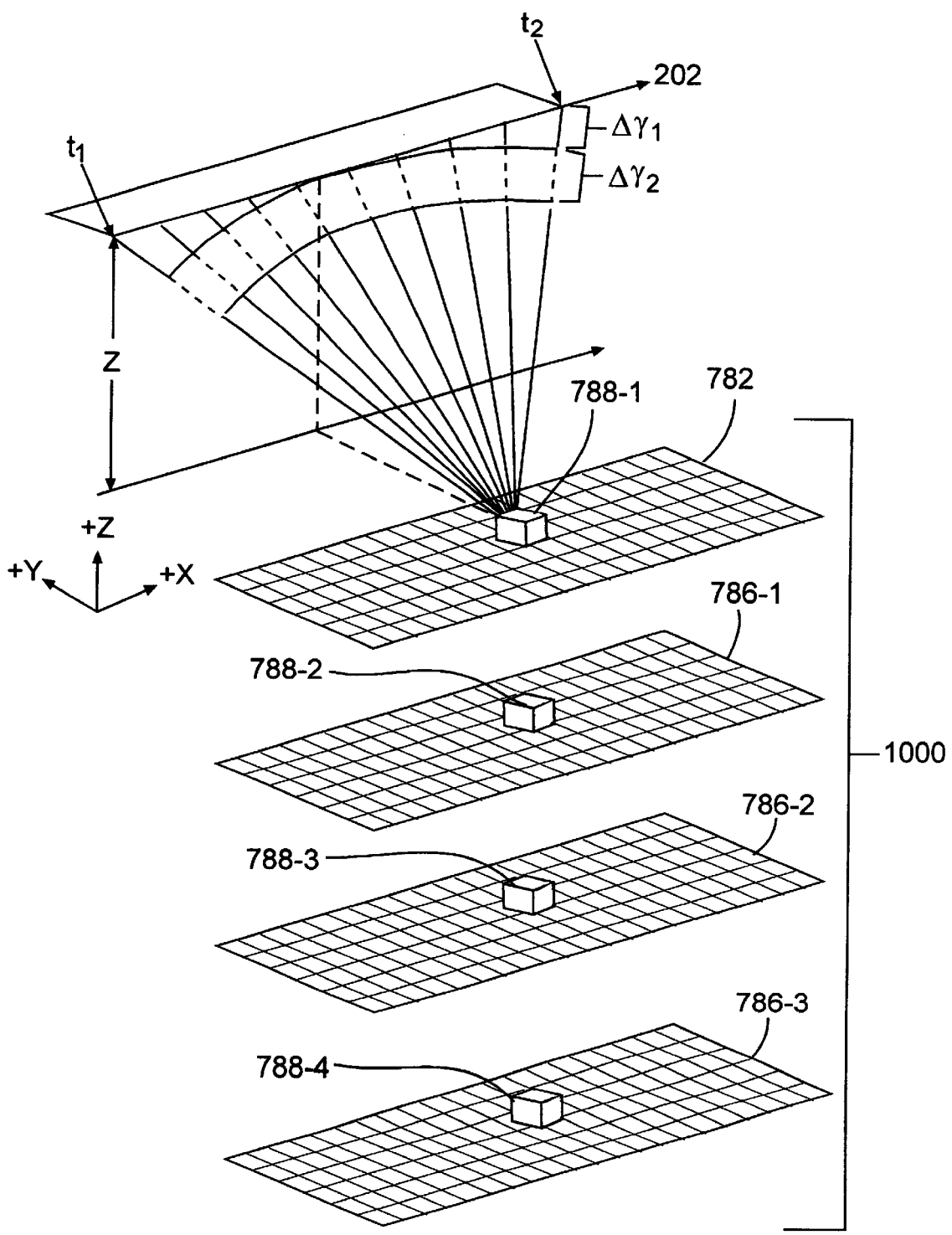
FIG. 8 is a schematic diagram of the ground-penetrating aspects of the radar analysis.

In addition, phase shifts resulting from the different refractive effects of the subterranean object's material and ground through which the radar signals are propagated permits resolution of features and their positions within the subterranean object 1000. The analysis is illustrated in FIG. 8, in which the subterranean object 1000 is shown schematically as including a subterranean object surface 782 and a series of planes 786 throughout the subterranean object. The subterranean object is subdivided into a plurality of individual cells 788 for individual characterization.

As the inspection vehicle 12 (not shown in FIG. 8) moves along navigation path 202, the radar signal for a particular cell 788-1 is first sensed at time $t_1$ and last sensed at time $t_2$. There are two focussing functions that are used to define the particular cell 788-1. First, a planar coordinate position, shown in Cartesian coordinates (x,y) in the figure for convenience, causes a first phase shift $\Delta\psi_1$, that varies with the motion of the inspection vehicle 12. Second, refractive effects associated with the depth of the particular cell 788-1 cause a second phase shift $\Delta\psi_2$, which remains uniform with the motion of the inspection vehicle 12. Focussing for the planar coordinate position is a straightforward phase correction that accounts for path length differences between a current position of the inspection vehicle 12 and the closest approach of the inspection vehicle 12. Depth focussing is accomplished by using a refractive propagation model appropriate for the expected material properties of the structures being analyzed to determine the effective path length difference between the subterranean object surface 782 and the particular plane 786 within the subterranean object, including the propagation delay that results from the different index of refraction in the subterranean object 1000.

Such analysis can thus provide, for example, a relative measure of the density distribution of the subterranean object 1000. The size and shape of the subterranean object 1000, or components of the object 1000, are defined by closed peripheries of the density distribution, corresponding to edges or surfaces. Furthermore, by recognizing in particular closed volumes within the subterranean object 1000 where the density is consistently less than the mean density of that region, structural anomalies are identified, together with their location. For example, a potential anomaly within pipeline is identified by its density being less that the average density of the pipeline in that region. Since the comparison is of a relative measure of the density, the method can function independent of knowing precisely what type of material any particular component of the subterranean object is made of.

Similar flexibility is provided by the system for embodiments directed at identification of different subterranean objects. Consider, for example, a system configured for the detection of unexploded ordnance. Using a hypothesis, the inspection technician 146 can quickly reconfigure the sensors to confirm the existence of unexploded ordnance. This sensor configuration will provide the operator with a complete set of sensor data, manage the data that the rules use in their decision process, provide insight into the functioning and viability of the data and allow for the exercising of the sensors in a real-time environment. The hypothesis-driven KOALAS system 480 also provides a dynamic means for examining data irregularities, subtle detections of unexploded ordnance and obvious detections of unexploded ordnance during real-time sensor operation. The system 480 facilitates the detection process by providing an environment and architecture for sensitizing or tuning the radar processes to the characteristics associated with prevalent forms of unexploded ordnance data and images.

The process of drawing these conclusions by performing the model comparison 744 is essentially a pattern-recognition algorithm being conducted by the trained evaluation system. In any specific implementation of such a pattern-recognition algorithm, it is beneficial to ensure that the trained evaluation system is making reliable determinations. This may be done by preliminary training of the evaluation system with an appropriate set of certifiable data that accounts for relevant factors in making the determinations, which is then encoded before the system is used to evaluate real data. For example, measurements may be performed on a number of subterranean objects, some of which are known to meet the required criteria, e.g. are pipelines with structural defects or are unexploded ordnance, in certain embodiments. Based on the identification and characterization of these structures, this information is used to train the evaluation system's pattern recognition algorithm. In the case training the evaluation system to recognize unexploded ordnance, for example, it will be known whether a test object is in fact unexploded ordnance or is a simply clutter. In the case of training the evaluation system to identify anomalies, the preliminary training may include a strength assessment, perhaps expressed as a percentage probability that the pipeline or other subterranean object will fail within a certain time as a result of the anomaly, determined from a complete analysis of the subterranean object external from the radar measurements.

Using artificial-intelligence techniques, the results of subsequent tests are used continually to perform refinement of the model used in making the structural determinations (step 748). For example, in one embodiment, a neural net is used to make the structural determinations. A typical neural network includes a plurality of nodes, each of which has a weight value associated with it. The network includes an input layer having a plurality of input nodes and an output layer having a plurality of output nodes, with at least one layer therebetween. In this example, the input nodes receive the data provided by the various sensor measurements and the output nodes generate an interpretation designation. The interpretation designation may be a simple binary indication, such as described above, that a given subterranean object is or is not unexploded ordnance, or is a pipeline imminently likely to fail or not. Alternatively, the interpretation designation may be a numerical percentage reflecting a probability that the object is unexploded ordnance, or reflecting the level of structural integrity for an underground pipeline. In other words, given an input comprising the sensor measurements, the input is combined (added, multiplied, subtracted, etc. in a variety of combinations and iterations depending upon how the neural network is initially organized), and then the interpretation is generated accordingly.

In order to train the neural net, the output values are compared against the correct interpretation with some known samples. If the output value is incorrect when compared against such a test interpretation, the neural net modifies itself to arrive at the correct output value. This is achieved by connecting or disconnecting certain nodes and/or adjusting the weight values of the nodes during the training through a plurality of iterations. Once the training is completed, the resulting layer/node configuration and corresponding weights represents a trained neural net. The trained neural net is then ready to receive unknown sensor data and discriminate subterranean objects for identification and/or characterization. Classical neural nets include Kohonen nets, feed-forward nets, and back-propagation nets. The different neural nets have different methods of adjusting the weights and organizing the respective neural net during the training process.

The analysis system may make use of other methods for making insulative-structure anomaly assignments on the basis of the sensor data. Such methods may be broadly categorized as falling into one of two classes. In the first class, the method begins with an initial approximation that is progressively improved using comparison feedback (step 746). For example, to identify a given subterranean object, the analysis system may begin with an initial structural size and shape estimate for the subterranean object, or may begin with an initial density profile for the subterranean object. The sensor data that would result from a subterranean object with those precise characteristics is calculated and compared with the actual sensor data. From such a comparison, the estimated structural characteristics for the subterranean object are refined. The process proceeds iteratively, with the estimated subterranean object structure being modified at each step to reproduce the measured sensor data more closely. When the difference between the measured sensor data and the calculated sensor data is less than a predetermined threshold, the process is deemed to have converged and the final report 115 is issued.

In the second class of methods, the system is permitted to vary essentially randomly and individual subterranean object-characteristic representations that develop during the process are evaluated to determine which best reproduces the measured sensor data. One example of such a method is a genetic algorithm. The genetic algorithm is a model of machine learning that derives its behavior in an attempt to mimic evolution in nature. This is done by generating a population of "individuals," i.e. subterranean object-characteristic representations, represented by "chromosomes," in essence a set of character strings that are analogous to the base-four chromosomes of DNA. The individuals in the population then go through a process simulated "evolution." The genetic algorithm is widely used in optimization problems in which the character string of the chromosome can be used to encode the values for the different parameters being optimized. In practice, therefore, an array of bits or characters to represent the chromosomes, in this case the position, size, shape and/or density profiles of the subterranean objects, is provided; then, bit manipulation operations allow the implementation of crossover, mutation, and other operations.

When the genetic algorithm is implemented, it is trained in a manner that may involve the following cycle: the fitness of all individuals in the population is first evaluated; then, a new population is created by performing operations such as crossover, fitness-proportionate reproduction, and mutation on the individuals whose fitness has just been measured; finally, the old population is discarded and iteration is performed with the new population. One iteration of this loop is referred to as a generation. According to embodiments of the present invention, a number of randomly generated subterranean objects with various structural characteristics may be used as the initial input. This population of subterranean objects is then permitted to evolve as described above, with each individual subterranean object being tested at each generation to see whether it can adequately reproduce the measured sensor data.

Still further methods that may occur to those of skill in the art, involving such techniques as simulated annealing or various fuzzy logic systems, may be used alternatively or supplementally to perform the analysis of the measured sensor data to generate the final report 115.

Having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A method for analyzing a subterranean volume, the method comprising:

imaging a ground surface of the subterranean volume;

propagating a radar signal from an airborne vehicle into the subterranean volume as the airborne vehicle moves along a navigation path;

receiving a reflected radar signal from a subterranean object within the subterranean volume;

ascertaining physical characteristics of the subterranean object from the reflected radar signal; and identifying the subterranean object from the ascertained physical characteristics.

2. The method recited in claim 1 wherein the radar signal has a frequency between 100 MHz and 2 GHz.

3. The method recited in claim 1 further comprising determining a location for the subterranean object.

4. The method recited in claim 3 wherein determining the location for the subterranean object comprises mapping a ground surface of the subterranean volume.

5. The method recited in claim 4 wherein mapping a ground surface of the subterranean volume comprises ascertaining longitude and latitude positions for the subterranean object with a global positioning system (GPS).

6. The method recited in claim 5 wherein mapping the ground surface of the subterranean volume comprises reflecting a laser signal.

7. The method recited in claim 1 further comprising measuring motion of the airborne vehicle with an inertial measurement unit, wherein ascertaining physical characteristics of the subterranean object from the reflected radar signal comprises compensating for the motion of the airborne vehicle as measured by the inertial measurement unit.

8. The method recited in claim 1 wherein imaging the ground surface comprises:
   detecting infrared radiation from the ground surface; and
   correlating the detected infrared radiation with the reflected radar signal.

9. The method recited in claim 8 wherein the detected infrared radiation has a wavelength between 3 and 5 $\mu$m.

10. The method recited in claim 8 wherein the detected infrared radiation has a wavelength between 8 and 12 $\mu$m.

11. The method recited in claim 1 wherein imaging the ground surface comprises:
   detecting visible-wavelength electromagnetic radiation from the ground surface;
   digitizing a signal from the detected visible-wavelength electromagnetic radiation; and
   correlating the digitized signal with the reflected radar signal.

12. The method recited in claim 1 further comprising detecting the subterranean object with a magnetometer.

13. The method recited in claim 1 further comprising detecting hydrocarbon emission from the subterranean object.

14. The method recited in claim 1 wherein identifying the subterranean object comprises evaluating whether the subterranean object contains a structural anomaly by comparing its ascertained physical characteristics with expected characteristics.

15. The method recited in claim 14 wherein evaluating whether the subterranean object contains a structural anomaly comprises ascertaining a location of any such structural anomaly.

16. The method recited in claim 14 wherein the subterranean object is a portion of an underground pipeline.

17. The method recited in claim 1 wherein the subterranean object comprises unexploded ordnance.

18. The method recited in claim 1 wherein identifying the subterranean object is performed by a trained evaluation system.

19. The method recited in claim 18 wherein the trained evaluation system comprises a neural net.

20. The method recited in claim 18 wherein the trained evaluation system comprises an expert system.

21. A method for identifying a subterranean object in a subterranean volume, the method comprising:
   mapping a ground surface of the subterranean volume with a laser signal;
   propagating a radar signal into the subterranean volume with a radar antenna while the radar antenna is in motion along a navigation path;
   measuring motion of the radar antenna with an inertial measurement unit;
   receiving a reflected radar signal from the subterranean object;
   ascertaining physical characteristics of the subterranean object from the reflected radar signal, including compensating for the motion of the radar antenna as measured by the inertial measurement unit; and
   comparing the ascertained physical characteristics of the subterranean object with a predetermined set of physical characteristics with a trained evaluation system.

22. The method recited in claim 21 further comprising ascertaining longitude and latitude positions for the subterranean object with a global positioning system.

23. The method recited in claim 21 further comprising:
   imaging the ground surface by detecting infrared radiation from the ground surface; and
   correlating the detected infrared radiation with the reflected radar signal.

24. The method recited in claim 21 further comprising:
   imaging the ground surface by detecting visible-wavelength electromagnetic radiation from the ground surface;
   digitizing a signal from the detected visible-wavelength electromagnetic radiation; and
   correlating the digitized signal with the reflected radar signal.

25. The method recited in claim 21 further comprising detecting the subterranean object with a magnetometer.

26. The method recited in claim 21 further comprising detecting hydrocarbon emission from the subterranean object.

27. The method recited in claim 21 wherein the subterranean object comprises unexploded ordnance.

28. A system for analyzing a subterranean volume, the system comprising:
   a radar source configurable for connection with an airborne vehicle; and
   an arrangement of at least one computer system in communication with the radar source and configured to accept instructions from an operator and to operate the radar source in accordance with the following:
      propagating a radar signal with the radar source into the subterranean volume as the airborne vehicle moves along a navigation path;
      receiving a reflected radar signal from a subterranean object within the subterranean volume; and
      ascertaining physical characteristics of the subterranean object from the reflected radar signal.

29. The system recited in claim 28 further comprising a laser mapping subsystem in communication with the arrangement of at least one computer system and configurable for connection with the airborne vehicle, wherein the arrangement of at least one computer system is further configured to operate the laser mapping subsystem in accordance with mapping a ground surface of the subterranean volume.

30. The system recited in claim 29 further comprising a global positioning system in communication with the arrangement of at least one computer system and configurable for connection with the airborne vehicle, wherein the arrangement of at least one computer system is further configured to operate the global positioning system in accordance with ascertaining longitude and latitude positions for the subterranean object.

31. The system recited in claim 28 further comprising an inertial measurement unit in communication with the arrangement of at least one computer system and configurable for connection with the airborne vehicle, wherein the arrangement of at least one computer system is configured to operate the inertial measurement system such that ascertaining physical characteristics of the subterranean object from the reflected radar signal comprises compensating for the motion of the airborne vehicle.

32. The system recited in claim 28 further comprising an infrared detector in communication with the arrangement of at least one computer system and configurable for connection with the airborne vehicle, wherein the arrangement of at least one computer system is further configured to operate the infrared detector for imaging a ground surface of the subterranean volume in accordance with the following:
    detecting infrared radiation from the ground surface; and
    correlating the detected infrared radiation with the reflected radar signal.

33. The method recited in claim 32 wherein the detected infrared radiation has a wavelength between 3 and 5 $\mu$m.

34. The method recited in claim 32 wherein the detected infrared radiation has a wavelength between 8 and 12 $\mu$m.

35. The method recited in claim 28 further comprising a visible-wavelength electromagnetic radiation detector in communication with the arrangement of at least one computer system and configurable for connection with the airborne vehicle, wherein the arrangement of at least one computer system is further configured to operate the visible-wavelength electromagnetic radiation detector for imaging a ground surface of the subterranean volume in accordance with the following:
    detecting visible-wavelength electromagnetic radiation from the ground surface;
    digitizing a signal from the detected visible-wavelength electromagnetic radiation; and
    correlating the digitized signal with the reflected radar signal.

36. The system recited in claim 35 wherein the visible-wavelength electromagnetic radiation detector is a charge-coupled device.

37. The system recited in claim 28 further comprising a magnetometer in communication with the arrangement of at least one computer system and configurable for connection with the airborne vehicle, wherein the arrangement of at least one computer system is further configured to operate the magnetometer for detecting the subterranean object with the magnetometer.

38. The system recited in claim 28 further comprising a hydrocarbon leak detector in communication with the arrangement of at least one computer system and configurable for connection with the airborne vehicle, wherein the arrangement of at least one computer system is further configured to operate the hydrocarbon leak detector for detecting hydrocarbon emission from the subterranean object.

39. The system recited in claim 28 wherein the arrangement of at least one computer system includes a trained evaluation system for identifying the subterranean object from the ascertained physical characteristics.

40. The system recited in claim 39 wherein identifying the subterranean object comprises evaluating whether the subterranean object contains a structural anomaly by comparing its ascertained physical characteristics with expected characteristics.

41. The system recited in claim 40 wherein evaluating whether the subterranean object contains a structural anomaly comprises ascertaining a location of any such structural anomaly.

42. The system recited in claim 40 wherein the subterranean object is a portion of an underground pipeline.

43. The system recited in claim 39 wherein the trained evaluation system comprises a neural net.

44. The system recited in claim 39 wherein the trained evaluation system comprises an expert system.

45. The system recited in claim 28 wherein the subterranean object comprises unexploded ordnance.

46. A system for analyzing a subterranean volume, the system comprising:
    a radar source configurable for connection with a vehicle;
    a radar antenna configurable for connection with the vehicle, the radar antenna being adapted to emit and receive electromagnetic signals;
    a laser mapping subsystem configurable for connection with the vehicle;
    an inertial measurement unit configurable for connection with the vehicle; and
    an arrangement of at least one computer system in communication with the radar source, the laser mapping subsystem, and the inertial measurement unit, and configured to accept instructions from an operator and to operate the radar source, the laser mapping subsystem, and the inertial measurement unit in accordance with the following:
        mapping a ground surface of the subterranean volume with the laser mapping subsystem;
        propagating a radar signal with the radar source into the subterranean volume as the airborne vehicle moves along a navigation path;
        measuring motion of vehicle with the inertial measurement unit;
        receiving a reflected radar signal from the subterranean object;
        ascertaining physical characteristics of the subterranean object from the reflected radar signal, including compensating for the motion of the vehicle as measured by the inertial measurement unit; and
        comparing the ascertained physical characteristics of the subterranean object with a predetermined set of physical characteristics with a trained evaluating system.

47. The system recited in claim 46 further comprising a global positioning system in communication with the arrangement of at least one computer system and configurable for connection with the vehicle, wherein the arrangement of at least one computer system is further configured to operate the global positioning system in accordance with ascertaining longitude and latitude positions for the subterranean object.

48. The system recited in claim 46 further comprising an infrared detector in communication with the arrangement of at least one computer system and configurable for connection with the airborne vehicle, wherein the arrangement of at least one computer system is further configured to operate the infrared detector for imaging the ground surface of the subterranean volume in accordance with the following:
    detecting infrared radiation from the ground surface; and
    correlating the detected infrared radiation with the reflected radar signal.

49. The system recited in claim 46 a charge-coupled device in communication with the arrangement of at least one computer system and configurable for connection with the airborne vehicle, wherein the arrangement of at least one computer system is further configured to operate the charge-coupled device for imaging a ground surface of the subterranean volume in accordance with the following:

detecting visible-wavelength electromagnetic radiation from the ground surface;

digitizing a signal from the detected visible-wavelength electromagnetic radiation; and correlating the digitized signal with the reflected radar signal.

50. The system recited in claim 46 further comprising a magnetometer in communication with the arrangement of at least one computer system and configurable for connection with the airborne vehicle, wherein the arrangement of at least one computer system is further configured to operate the magnetometer for detecting the subterranean object with the magnetometer.

51. The system recited in claim 46 further comprising a hydrocarbon leak detector in communication with the arrangement of at least one computer system and configurable for connection with the airborne vehicle, wherein the arrangement of at least one computer system is further configured to operate the hydrocarbon leak detector for detecting hydrocarbon emission from the subterranean object.

52. The system recited in claim 46 wherein the subterranean object comprises unexploded ordnance.

53. A system for analyzing a subterranean volume, the system comprising:

laser means for mapping a ground surface of the subterranean volume;

radar means for propagating a radar signal into the subterranean volume;

transport means for moving such radar means along a navigation path;

inertial measurement means for measuring motion of the radar means; and computer means in communication with the laser means, the radar means, the transport means, and the inertial measurement means, and configured to accept instructions from an operator and to operate the laser means, the radar means, the transport means, and the inertial measurement means in accordance with the following:

mapping the ground surface of the subterranean volume with the laser means;

propagating the radar signal with the radar means into the subterranean volume as the radar means is moved along a navigation path;

measuring motion of radar means with the inertial measurement means;

receiving a reflected radar signal from the subterranean object;

ascertaining physical characteristics of the subterranean object from the reflected radar signal, including compensating for the motion of the vehicle as measured by the inertial measurement means; and comparing the ascertained physical characteristics of the subterranean object with a predetermined set of physical characteristics with a trained evaluating system.

54. The system recited in claim 53 further comprising global positioning means in communication with the arrangement of at least one computer system, wherein the arrangement of at least one computer system is further configured to operate the global positioning means in accordance with ascertaining longitude and latitude positions for the subterranean object.

55. The system recited in claim 53 further comprising infrared detector means in communication with the arrangement of at least one computer system, wherein the arrangement of at least one computer system is further configured to operate the infrared detector means for imaging the ground surface of the subterranean volume in accordance with the following:

detecting infrared radiation from the ground surface; and correlating the detected infrared radiation with the reflected radar signal.

56. The system recited in claim 53 further comprising charge-coupled device means in communication with the arrangement of at least one computer system, wherein the arrangement of at least one computer system is further configured to operate the charge-coupled device means for imaging a ground surface of the subterranean volume in accordance with the following:

detecting visible-wavelength electromagnetic radiation from the ground surface;

digitizing a signal from the detected visible-wavelength electromagnetic radiation; and correlating the digitized signal with the reflected radar signal.

57. The system recited in claim 53 further comprising magnetometer means in communication with the arrangement of at least one computer system, wherein the arrangement of at least one computer system is further configured to operate the magnetometer means for detecting the subterranean object with the magnetometer means.

58. The system recited in claim 53 further comprising hydrocarbon leak detection means in communication with the arrangement of at least one computer system and configurable for connection with the airborne vehicle, wherein the arrangement of at least one computer system is further configured to operate the hydrocarbon leak detection means for detecting hydrocarbon emission from the subterranean object.

59. The system recited in claim 53 wherein the subterranean object comprises unexploded ordnance.

\* \* \* \* \*